(12) United States Patent  (10) Patent No.: US 7,528,795 B2
Schlager et al.  (45) Date of Patent: May 5, 2009

(54) HIGH GAIN ANTENNA AND MAGNETIC PREAMPLIFIER

(75) Inventors: Kenneth J. Schlager, Hartland, WI (US); Jason W. Zehrung, Milwaukee, WI (US)

(73) Assignee: Hiercomm, Inc., Hartland, WI (US)

( * ) Notice: Subject to any disclaimer, the term of this patent is extended or adjusted under 35 U.S.C. 154(b) by 0 days.

(21) Appl. No.: 11/621,408

(22) Filed: Jan. 9, 2007

(65) Prior Publication Data

US 2008/0165072 A1    Jul. 10, 2008

(51) Int. Cl.
*H01Q 1/36* (2006.01)
*H01Q 7/00* (2006.01)
*H01Q 1/44* (2006.01)

(52) U.S. Cl. .................. 343/895; 343/748; 343/856

(58) Field of Classification Search ................ 343/741, 343/748, 866, 867, 872, 702, 895, 793, 797, 343/810–820, 846, 856, 972
See application file for complete search history.

(56) References Cited

U.S. PATENT DOCUMENTS

| | | | | | |
|---|---|---|---|---|---|
| 3,763,045 | A | * | 10/1973 | Takamizawa et al. | .... 252/62.57 |
| 3,971,020 | A | * | 7/1976 | Howard | ........................ 342/129 |
| 4,873,527 | A | * | 10/1989 | Tan | ............................... 343/718 |
| 5,850,200 | A | * | 12/1998 | Johannessen et al. | ........ 343/867 |
| 6,011,524 | A | * | 1/2000 | Jervis | .......................... 343/895 |
| 7,202,766 | B2 | * | 4/2007 | Inuzuka | ........................ 336/83 |
| 7,386,290 | B2 | * | 6/2008 | Li et al. | ....................... 455/293 |

* cited by examiner

*Primary Examiner*—Shih-Chao Chen
(74) *Attorney, Agent, or Firm*—Alan R. Stewart; Godfrey & Kahn, S.C.

(57) ABSTRACT

An antenna and associated magnetic preamplifier for use with UHF and Microwave wireless telecommunications devices operating at frequencies of greater than 0.3 gigahertz. The antenna may include a plurality of concentric loops about a core. The antenna may be made of a conductor wound helically about an air core with a circumference and a number of loops, and the spacing of the loops chosen based on the desired frequency of communication. The antenna may include a plurality of loops of conductor about a core with a ferrite rod positioned within the core. The antenna may be omnidirectional and provide a high gain at the desired frequency of communication. The magnetic preamplifiers may be based on either resonant or ferrite material-enhanced amplification. Resonant and ferrite enhancements may also be used in combination.

7 Claims, 9 Drawing Sheets

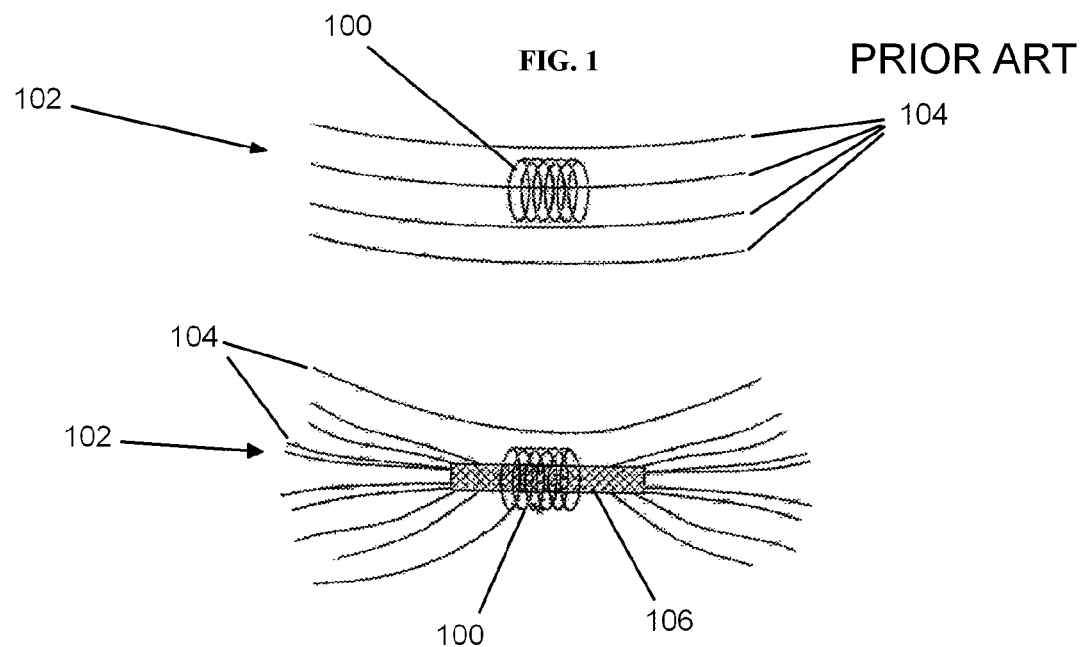
FIG. 1 PRIOR ART
FIG. 2
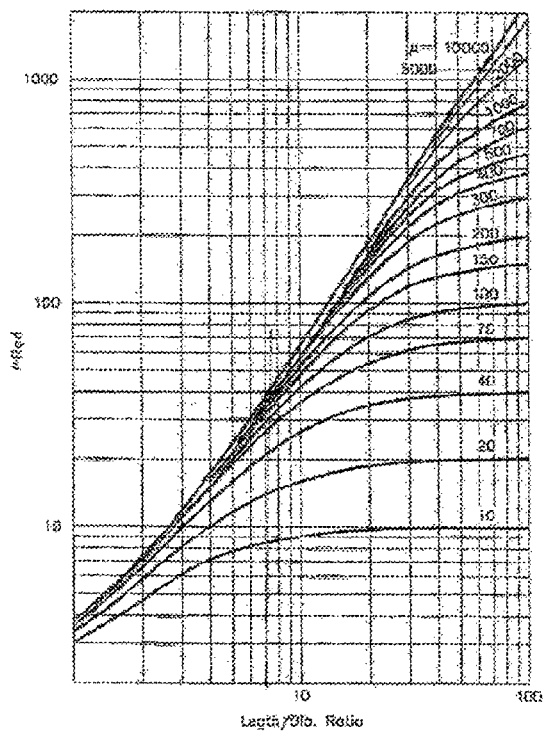
FIG. 3

HIGH GAIN ANTENNA AND MAGNETIC PREAMPLIFIER

TECHNICAL FIELD

The present invention relates generally to improved loop antennas and associated passive magnetic preamplifiers.

BACKGROUND

The performance of any communications system in terms of throughput (data rate) can be improved according to Shannon's Law (described below) in either of two ways:
1. Improved Bandwidth and Bandwidth Efficiency
   by increasing the channel bandwidth
   by improving the bandwidth efficiency through efficient signal modulation techniques and signal processing methods for improving bandwidth efficiency
2. Improved Signal-to-Noise Ratio (SNR)
   by increasing signal power
   by decreasing noise power Most technical advances in wireless communications systems have focused on the first of the above—bandwidth and bandwidth efficiency. Though not as commonly addressed, possible approaches to improving on SNR may include implementing advanced antenna technology. By increasing the gain of both directional and omnidirectional antennas, it is possible to expand the capabilities of broadband wireless by increasing signal levels which increases throughput performance in accordance with Shannon's Law.

It is also possible to improve SNR to a much higher level by attaching a high gain, low noise preamplifier to the antenna for much greater signal gain. This combination is known by the designation "active antenna" since it includes an active electronic component augmenting the gain of the passive antenna. In common practice, this preamplifier would be electronic in nature and require electric power for its operation. Such electronics and power requirements significantly increase the complexity and cost of the active antenna.

Magnetic amplifiers in power and control applications were used extensively in World War II, particularly by the Germans in a variety of military roles. Magnetic amplifiers experienced a brief resurgence in the U.S. in the 1950s as a possible replacement for vacuum tubes, but the advent of power transistors and other solid state power devices led to a decline of interest.

Improvements in both directional and omnidirectional antenna technology as well as magnetic preamplifiers are possible by employing singly or together the concepts of circuit resonance and ferrite magnetic amplification. Circuit resonance achieves higher gain by narrowing the bandwidth of an antenna using a series or parallel resonant circuit in which inductive reactance is cancelled by an equal and opposite capacitive reactance. The ratio of the inductive reactance to circuit resistance determines the Q gain value of the circuit. The feasibility of this approach depends on the basic antenna or amplifier circuit having sufficient inductance to produce high Q values. Loop antennas and their various solenoid, helix and loop Yagi derivatives have this characteristic. Magnetic preamplifiers also may be structured with the required high inductance.

Resonant and ferrite antenna amplification both depend on the original basic antenna configuration. In general, helix antennas are preferable because of their higher gain to turn ratio. Solenoids require a large number of turns to achieve any gain alone and are, therefore, completely dependent on the resonant or ferrite circuit for their gain enhancement. Loop Yagi antennas are more complex in their design and require the determination of design parameters by experimentation.

Conventional wireless communications systems, such as those employing WiFi (IEEE Standard 802.11), WiMAX (IEEE Standard 802.16) and other advanced wireless communications technologies, rely on conventional antennas. The operational and functional characteristics of such antennas determine the range and throughput of these broadband wireless communications systems. In some applications, as in low population density rural areas, broadband wireless communications systems may not be economically feasible with conventional antennas. Without higher gain antennas and/or supporting preamplifiers, the number of access points (antenna base stations) required to cover a geographic area may be excessive, considering the number of potential users in the area. Installation of higher gain antennas at both user premises and network access points may significantly extend the range of each access point, thereby greatly reducing the number of access points needed to cover a specified geographic area.

WiFi and Narrowband Personal Communications Services (PCS) networks conventionally deploy omnidirectional antennas in mobile devices (for example, cellular telephones) configured to work in their communications networks. Conventional omnidirectional antennas available for use in these mobile devices are typically low gain monopole antennas. While arrays of directional antennas may be used at base stations, these mobile devices with low gain antennas may drive a need for a greater density of fixed antennas to permit a desired level of operability and geographic coverage of these conventional networks.

The result of the use of these low gain antennas in mobile devices may be the weak link in these wireless communication networks, according to Shannon's Law. In addition, increasing efficiency of base station or fixed antennas may also aid in the expansion of conventional wireless telecommunications networks.

Improvements to conventional antennas for wireless communications networks are desirable.

SUMMARY

The present invention relates generally to improved loop antennas and associated passive magnetic preamplifiers. More specifically, the present invention relates to significantly higher gain loop antennas and magnetic preamplifiers in broadband wireless communication networks that greatly enhance the throughput performance of these networks while simultaneously reducing the infrastructure deployment costs. The gain improvements in these active loop antennas may be achieved either by the integration of high-Q resonant circuits or by the addition of ferrite-based magnetic core circuits.

In one embodiment of the present invention, a wireless telecommunications device comprises a housing, an antenna including a plurality of spaced apart coil loops positioned about and defining a core, the device configured to communicate in frequencies greater than 0.3 gigahertz.

In a further embodiment of the present invention, an antenna is configured for use with a telecommunications device which communicates at frequencies greater than 0.3 gigahertz. The antenna includes a conductor formed into a helical coil having a plurality of loops, the loops defining a diameter and generally consistently spaced apart. The helical coil defines an axial core. The number of loops, the diameter of the loops and the spacing of the loops are selected based on a desired frequency of communication of the telecommunications device.

Another embodiment of the present invention includes a method of configuring a loop coil antenna for a wireless telecommunications device. The method includes selecting a desired frequency at which the device will operate, selecting a size of conductor, a number of coils of conductor, a spacing between adjacent coils, and a coil diameter to maximize the gain of the antenna for the desired frequency, and selecting a capacitor for the antenna which will achieve high gain resonance in the antenna circuit.

In a still further embodiment of the present invention, a wireless telecommunications device includes a housing, an antenna defining a core including a ferrite core positioned within the core and a magnetic preamplifier electrically connected to the antenna. The device is configured to communicate in frequencies greater than 0.3 gigahertz.

In an additional embodiment of the present invention, a wireless telecommunications device includes a housing, an antenna and a passive magnetic preamplifier electrically connected to the antenna. The device is configured to communicate in frequencies greater than 0.3 gigahertz.

BRIEF DESCRIPTION OF THE DRAWINGS

The accompanying drawing figures, which are incorporated in and constitute a part of the description, illustrate several aspects of the invention and together with the description, serve to explain the principles of the invention. A brief description of the figures is as follows:

FIG. 1 is an side view of a prior art air core loop antenna positioned within lines of flux of an electromagnetic field within which the air core loop is positioned.

FIG. 2 is a side view of a loop antenna according to the present invention, with a ferrite core positioned within the loop antenna and the assembly positioned within lines of flux of an electromagnetic field.

FIG. 3 is a graph of a permeability of a rod for use with the present invention based on the permeability of the material used to form the rod and the length/diameter ratio of the rod.

FIG. 13b is a schematic diagram of a microstrip preamplifier of FIG. 13a.

FIG. 15b is a circuit diagram of the preamplifier of FIG. 15a.

DETAILED DESCRIPTION

Reference will now be made in detail to exemplary aspects of the present invention which are illustrated in the accompanying drawings. Wherever possible, the same reference numbers will be used throughout the drawings to refer to the same or like parts.

The present disclosure relates generally to resonance-enhanced and magnetically-enhanced high gain antennas and preamplifiers which may be used in broadband wireless communications systems employing WiFi (IEEE Standard 802.11), WiMAX (IEEE Standard 802.16) and other advanced wireless communications technologies. However, it is not intended that the present disclosure be limited to the solely these wireless communications technologies. High gain antennas and magnetic preamplifiers such as those described herein may improve the range and throughput of any broadband wireless communications system. In some applications, as in low population density rural areas, broadband wireless communications systems may not be economically feasible without these technologies. Installation of high gain antennas and antennas coupled with magnetic preamplifiers at both user premises and network access points may significantly extend the range of each access point as compared to conventional antennas, and may thereby greatly reduce the number of access points needed to cover a specified geographic area.

Figure 17:
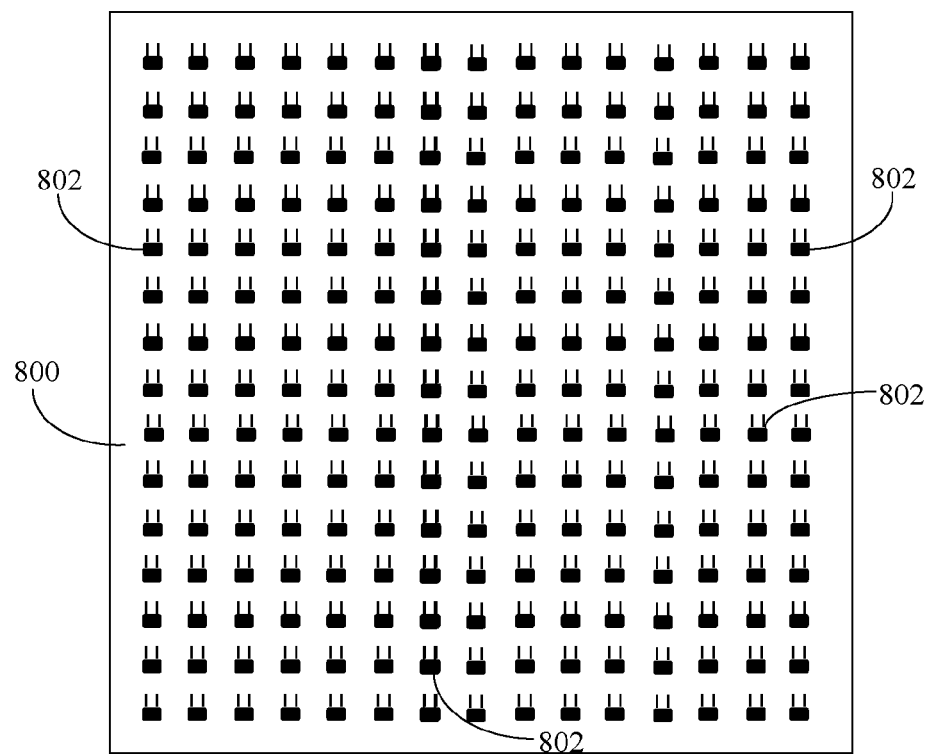
FIG. 17 is an schematic drawing of a geographic area with wireless telecommunications coverage is provided by a plurality of telecommunications towers.
Figure 18:
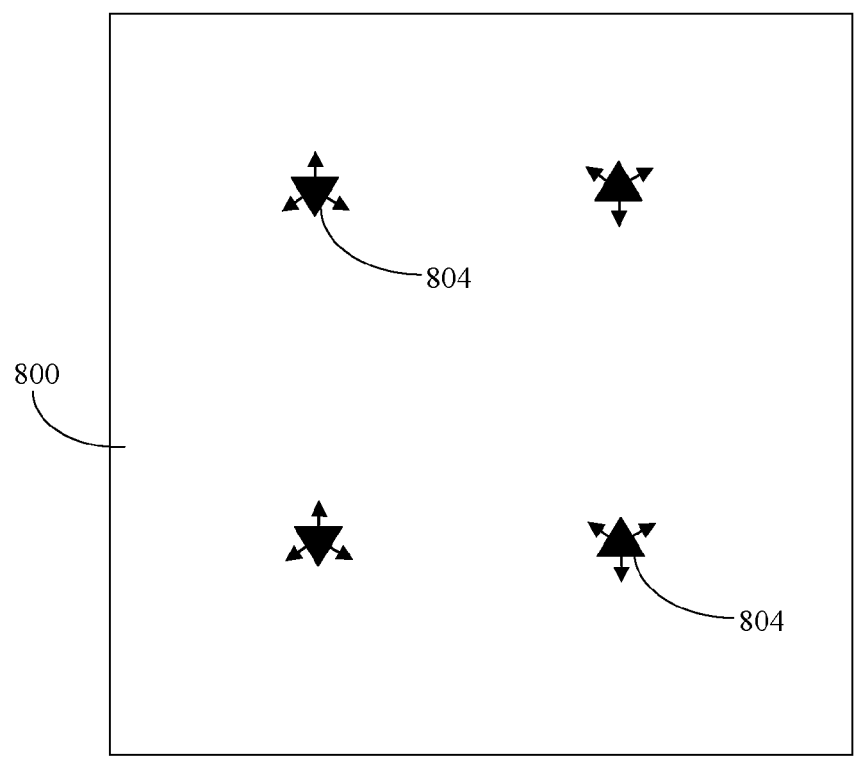
FIG. 18 is a second schematic drawing of the geographic area of FIG. 17, with wireless telecommunications coverage provided by a second plurality of telecommunications towers.

FIG. 17 illustrates a geographic area 800 with a plurality of conventional access points or telecommunications towers 802 providing coverage for wireless telecommunications devices within the area. The spacing of towers 802 within area 800 is to some extent dependent on the ability of the wireless devices within the area to receive signals from the towers. FIG. 17 shows a configuration of towers 802 within area 800 required to support use of conventional telecommunications devices. FIG. 18 illustrates geographic area 800 with a much smaller number of towers 802 that may be required to provide coverage for the same area 800 when wireless telecommunications devices according to the present disclosure are utilized. In addition, antenna enhancements as described herein may be incorporated into one or more telecommunications towers 804 to further enhance the coverage for wireless telecommunications within area 800.

Depending on the network topology, both directional and omnidirectional antennas may be needed in a broadband wireless network. The present disclosure provides examples of resonance-enhanced and magnetically enhanced versions of both directional and omnidirectional antennas and supporting magnetic preamplifiers that may be used with such antennas.

Antennas according to the present disclosure are based upon variations of one of the two basic antenna forms—the loop antenna. The other basic antenna form is the vertical dipole—or its electromagnetic equivalent—the monopole. Loop antennas have significant advantages in some applications. Most noteworthy for the invention here are:

1. Low noise

Loop antennas are characterized by low noise levels which make them very useful in receivers where signal-to-noise ratio (SNR) is the key parameter.

2. Resonance Enhancement

Loop antennas, whether in solenoid form, helix form or other configurations, create inductance in the circuit. If a suitable capacitor is placed in series with the loop antenna, a resonant circuit is created that has a higher gain at the resonant frequency as expressed in the Q value of the circuit.

3. Magnetic Enhancement

Loop antennas may also be further enhanced in performance by the addition of high permeability ferrite cores which decrease path reluctance and serve as high gain magnetic amplifiers.

Resonant loops have been used for many years in radio station selection circuits in AM and FM radio receivers. Resonant tuning not only amplifies the desired station signal, but it also eliminates interference from adjoining frequency bands. Such resonant circuits are highly useful in cellular wireless networks where high gain may improve throughput performance and minimizes interference from nearby cells on different frequency channels.

A major disadvantage of the loop antenna is its relatively low efficiency as a radiator in signal transmission. This efficiency is particularly low in electrically small loops, i.e., configurations wherein the loop circumference is small relative to the wavelength. Fortunately, such efficiency may also be improved through the addition of ferrite cores. A key parameter in determining the transmission efficiency of an antenna is its radiation resistance. Radiation resistance can be increased in electrically small antennas by the addition of a ferrite core along the axis of a multi-loop configuration. This radiation resistance is increased by the square of the relative permeability of the ferrite core, so that a relative rod permeability of 30 would increase the radiation resistance by a factor of 900. In electrically large antennas, radiation resistance and transmission of efficiency are typically less of a problem, but even these antenna designs are improved by their integration with ferrite cores. Some of the designs described herein may be electrically small in nature while others may be larger relative to wavelength, but all designs will be gain and efficiency enhanced by the addition of ferrite cores.

Ferrite core loop antennas have typically been applied only to the lower frequency bands (AM broadcast band and up to the lower VHF bands). Such restriction was partially based on market needs and partially due to the frequency range limitations of popular ferrite materials. Nickel-Zinc ferrites typically exhibit high permeability only in the lower radio frequency bands. Newer ferrite materials such as Calcium Vanadium Garnet offer high permeability ferrite performance up into the UHF (0.3-3.0 GHz) and even the SHF (3.0-30.0 GHz) bands. Other materials exhibiting similar physical, electrical, or permeability characteristics may be suitable for use within the present disclosure and provide similar improvements to antennas efficiency described herein.

Beyond the ferrite materials employed, the present disclosure also presents air core and ferrite core loop antenna configurations based not only on the traditional solenoid coil but in quite different configurations, such as the Loop Yagi Uda and helical form antennas. It is anticipated that the improvements disclosed herein may be applicable to other forms and configurations of loop antennas or wireless communications transmission devices. The end result is a very high gain, low noise antenna system that can significantly improve the performance and lower the cost of broadband wireless communications systems.

Ferrite materials may also be used to enhance the gain and efficiency of small signal magnetic amplifiers that employ solenoid or other coil configurations to amplify signal outputs of the antenna. A major advantage of using ferrites in magnetic amplifiers rather than in the antenna itself is design flexibility. Antenna design for high gain is almost always in conflict with other design specifications of operational importance. An example is the VSWR (Voltage Standing Wave Ratio) parameter which is a measure of the impedance match between the load and the antenna or other electronic intermediaries. Another advantage of providing primary gain in the preamplifier rather than in the antenna is that the amplifier gain is in addition to the antenna gain and is independent of the compromises required in antenna design. For this reason, incorporation of a magnetic preamplifier into a wireless communications system may improve the overall performance of the wireless communications system when used with a conventional antenna or with improved antennas as described herein.

One primary objective of many communications system is to maximize throughput or data rate in terms of bits per second through the network. The throughput capacity of a channel of a network is determined by the simple equation known as Shannon's Law, presented above. According to this law, channel capacity, throughput depends on:

Bandwidth of the medium
Signal power at the receiver, and
Noise power at the receiver.
Stated mathematically:

$$C = B \times \log_2(1 + S/N)$$

C—channel capacity—bits/second
B—bandwidth—Hertz
S—signal power—milliwatts
N—noise power—milliwatts The above expression stipulates that for a given channel bandwidth, the maximum possible data transmission rate is determined by the receiver signal to noise ratio (SNR). Improvements in the SNR come about from either higher intensity signals or reduced noise. The problem is best approached in tandem amplifying signal levels and reducing noise.

In wireless networks, there may also be a tradeoff between range and throughput since signal level at the receiver declines with the distance from the transmitter. Based on this relationship, it is possible to achieve the same throughput at longer ranges through improvements in the signal-to-noise ratio. Such improvements may significantly reduce the capital costs of wireless network infrastructure deployment. The longer the range between transmitters and receivers for a specified level of performance, the fewer antenna base stations may be needed to serve users. Most efforts to improve network throughput have emphasized increases in bandwidth, but the present disclosure describes an approach to improve throughput through enhancements in the SNR.

SNR enhancements by definition may be achieved by increasing the signal power or decreasing the noise level. In antenna design, output signal levels may be improved with higher levels of antenna gain. Noise levels may be maintained or reduced through judicious selection of antenna topology and structure. One embodiment of a loop structure disclosed herein is a closed-circuit antenna which is a low noise device. If the low noise level, as expressed by the term noise figure, is maintained while the signal level is elevated through higher gain antenna design, then increased SNR levels may be achieved.

One method of increasing antenna gain in a defined bandwidth may involve the creation of an induction-capacitance resonant circuit that increases the gain in the selected band but rejects signals outside the selected band. Proper selection of wire size and other design factors may allow for effective impedance matching at the output of the antenna. Such an approach to enhancing the gain of an antenna is disclosed in U.S. Pat. No. 4,806,906.

A second basic phenomenon utilized in the improvements of the present disclosure—ferrite core amplification of antenna gain—is illustrated in FIGS. 1 and 2. If an air-core loop 100 is placed in an electromagnetic field 102, air core loop 100 cuts the lines of flux 104 without disturbing them, as illustrated in FIG. 1. In contrast, FIG. 2 shows that when a ferrite magnetic core 106 is placed in the same field 102, the nearby field lines 104 are redirected into loop 100. Such redirection occurs because the reluctance of ferrite material 106 is less than that of the surrounding air. As a result, the nearby flux lines 104 tend to flow through loop 100 rather than passing it by. Reluctance is the magnetic equivalent of resistance, and flux is analogous to current in an electric circuit. The reluctance is inversely proportional to the permeability of the rod ($\mu_{rod}$).

The quantitative effect of ferrite rod magnetic amplification is shown by a pair of loop antenna gain equations:

$$G=V/E=2\pi QNA/\lambda \quad \text{(Equation 1)}$$

where
G=gain
V=output voltage across the loop terminals
E=RF field strength in volts per meter
N=number of turns in the loop winding
$\lambda$=wavelength in meters
A=loop area in square meters
Q=resonant gain Equation 1 represents loop antenna gain with an air core.

$$G=V/E=2\pi QN A\mu_{rod}/\lambda \quad \text{(Equation 2)}$$

where
$\mu_{rod}$—relative permeability of the ferrite rod in comparison with an air core Equation 2 represents loop antenna gain with a ferrite core.

With expected $\mu_{rod}$ values in the 40 region, the addition of the ferrite core represents a significant increase gain as a result of higher levels of collected signals. A rod permeability of 40 is equivalent to an antenna area increase of 40 times. Expressed in antenna technology, a rod permeability of 40 represents a gain increase of 32 dBi.

Additional antenna gain may be achieved by tuning the antenna to a narrower band of operation. The large increase in inductance resulting from the ferrite core integration may be expressed as:

$$L=4\pi N^2 A\mu_{rod} \times 10^{-7}/l$$

where
L—inductance in Henries
N—number of turns
A—cross sectional area in square meters
l—magnetic length of core in meters The loop Q is then $$Q=2\pi fL/R$$

where
f—Frequency, Hertz
R—AC resistance in ohms

The AC resistance is caused primarily by the skin effect at the higher radio frequencies of interest herein:

$$R=0.996\times 10^{-6}l'(f)^{1/2}/12d$$

where
d=conductor diameter in inches
l'=wire length in inches

The revised gain equation is then $$G=V/E=2\pi AN\mu_{rod}Q/\lambda$$

Typical values of $\mu_{rod}$=40 and Q=10 may together result in an antenna gain improvement of:

$$\Delta G=Q\mu_{rod}=40\times 10=400$$

In decibels=20 log 400=52 dBi

Resonance tuning may be intrinsic in the winding capacitance of the loop itself or externally with a capacitor across the loop terminals.

Implementation of the ferrite core loop antenna requires ferrite material with the required permeability in the UHF-SHF frequency bands of interest (0.3-30.0 GHz). Such a material is found in Calcium Vanadium Garnet which in a recently tested sample had an initial permeability over 300 in these frequency bands.

This initial permeability translates into a rod permeability of about 40 for a 7 inch long 1 inch diameter rod. The relationship between rod permeability and material permeability is graphically shown in FIG. 3.

The conventional approach to antenna design attempts by proper dimensioning of antenna parameters to create a resonant device with a purely resistive output impedance of 50 ohms. Such an output impedance is needed to match with connecting cables and/or transceiver equipment to which the antenna must be connected. To realize the benefits of ferromagnetic and resonance amplification of antenna designs, this conventional approach may be modified in accordance with the present disclosure.

For either the ferromagnetic or resonance approach to be effective, some level of inductance must be present in the circuit. In ferromagnetic amplification, as described herein, the ferrite core inserted in the loop antenna may increase the permeability and resulting gain of the circuit. For resonance amplification, inductive circuit reactance may be compensated by an equal and opposite capacitive reactance to achieve a new amplified resonance. The Q (gain) of this resonant circuit will typically be significantly higher than the natural resonance of a conventional antenna design. For each of the novel antenna design examples presented herein, design procedures which may be used to bring about the new high gain antenna design will be described.

Described herein also is a new high gain, low noise magnetic preamplifier that is passive in nature and much lower in cost than a conventional electronic preamplifier. The described magnetic preamplifier is comprised only of inductive, capacitive, resistive, microstrip, magnetic and other passive components not requiring an external power source. The incoming or outgoing radio signal provides the electronic flow in the preamplifier device. Magnetic amplifiers have a long and colorful history stretching back to a paper by Rayleigh in 1887 [Rayleigh 1887], but these amplifiers were typically used in power applications rather than low signal preamplifier applications and required an external AC power source. The magnetic preamplifier presented here is for low power, radio signal amplification and operates without any external AC or DC power source. The described magnetic preamplifier represents a radically different technology and resembles previous magnetic amplifiers only in its use of inductive components.

Figure 11:
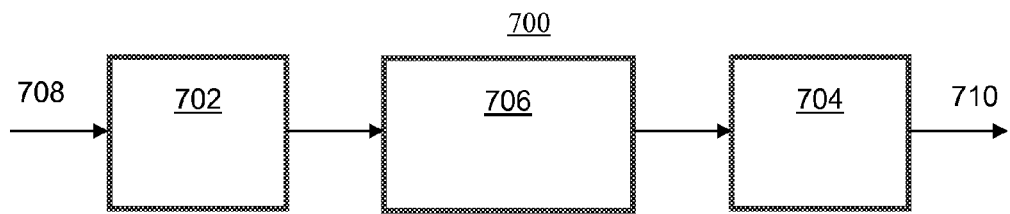
FIG. 11 is a functional diagram of a magnetic preamplifier according to the present invention.
Figure 12:
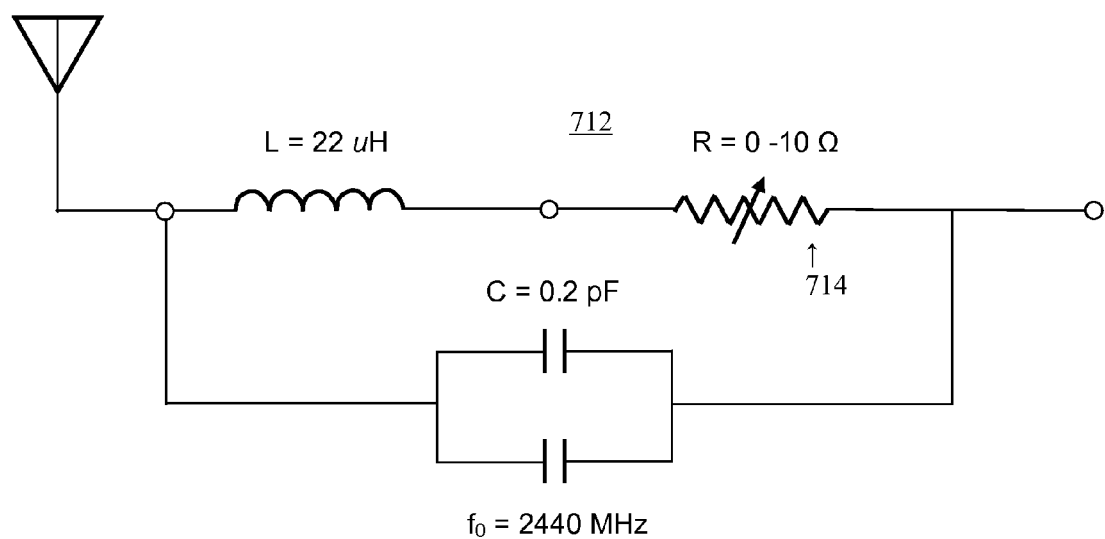
FIG. 12 is a schematic diagram of a lumped element resonant magnetic preamplifier according to the present invention.

Gain enhancements such as described herein for antenna design may be achieved more independently in a magnetic preamplifier that processes antenna output and input signals for reception or transmission. In reception, the magnetic preamplifier would increase the signal level of the antenna output for maximizing throughput through the channel. In transmission, it will also amplify the signal for better system output. These performance enhancements are carried out with passive components not requiring electrical power input. A functional diagram of a magnetic preamplifier is shown in FIG. 11. An input matching circuit provides an impedance match with a 50 ohm coaxial cable for efficient signal transfer. The input signal is then amplified using either a resonant or ferrite enhanced inductor circuit. The amplified output is then matched to an output coaxial cable for transmission to the transceiver. Details of the resonance and ferrite amplifier circuits are shown in FIGS. 12 to 16. The basic gain design equation for the magnetic preamplifier is Equation 2, shown above on page 14. This equation applies to both the ferrite and resonant versions of the amplifier. If the ferrite is included in a non-resonant circuit, then Q will be set at a value of one. In a non-ferrite resonant circuit μ would be set at one.

The above description encompasses much of the basic technology of the present disclosure and will be referenced in the following descriptions.

This technology may also be applied to a number of directional and omnidirectional antenna design configurations as well as magnetic preamplifier designs including:

Helical Air Core Loop Application

Figure 4:
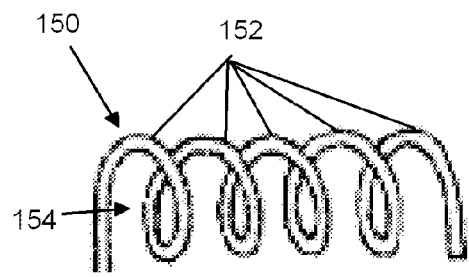
FIG. 4 is a side perspective view of an air core helical coil antenna according to the present invention.
Figure 5:
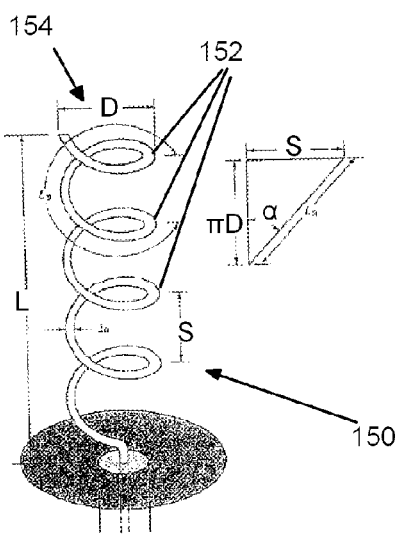
FIG. 5 is a side view of a helical coil antenna according to the present invention with different parameters for the antenna indicated.

Air core loop antennas depend upon circuit resonance with gain enhancement dependent on the value of Q. The two major circuit structures are the solenoid and the helix. Solenoids typically feature close winding structures with little or no space between windings. Helical antennas, in contrast, have ordered spacing between windings in spring-like structures. Helix topologies have the ability to achieve reasonable gain levels with a small number of turns even without resonance amplification. Solenoids, in contrast, may require over 100 turns to reach unity gain (0 dBi). To achieve adequate gain levels in a solenoid, Q values as high as 500 may be necessary. Such high Q values may reduce the bandwidth to channel sizes inconsistent with the 20 MHz bandwidths typical in WiFi/WiMAX network applications. A sample set of design calculations below illustrate an example of a design according to the present disclosure. FIGS. 4 and 5 illustrate a helical coil antenna 150 with a plurality of loops 152 of a conductor positioned about an open or air core 154.

A computer program for a traditional helical antenna design executes the following set of equations:

$$C = 1.066 + 0.003\,(N-5)$$

Where
C—circumference in wavelengths at peak gain
N—number of helix turns
$\lambda_p$—wavelength at helix peak gain Experimental research has shown that the above empirical function provides the helix circumference necessary to achieve maximum gain at a particular frequency as related to the number of turns. Such research may be found, for example, in "Helical Antenna Design", by Bob Atkins, in *UHF/Microwave Experimenter's Manual*, American Radio Relay League, 2000.

The value of the achieved gain at the peak wavelength is defined as follows:

$$G_p = 8.3(\pi D/\lambda_p)\sqrt{N+2-1}(NS/\lambda_p)^{0.8}$$

Where
α is the helix pitch angle $$\alpha = \arctan S/\pi D = 12.5 \text{ degrees}$$

D—helix diameter
N—number of helix turns
S—spacing between helix turns
$\lambda_p$—wavelength at peak gain The above dimensioning of antenna parameters will produce a typical conventional helix antenna design with a gain dependent primarily on the length of the antenna. Such a design procedure produces an antenna with an approximate resistive component of around 140 ohms that may then be reduced to 50 ohms by an impedance matching circuit. The reduction of the resistive component to 50 ohms may bring the antenna into balance with other electrical devices and circuits to which the antenna may be connected. Since the procedure is only approximate, a small inductive or capacitive value may also need to be eliminated in the matching design. In accordance with the novel approach to designing antennas presented herein, the above procedure maybe modified to create, not eliminate, inductance in the circuit, with the added inductance to be compensated by the addition of a capacitor to resonate with a higher Q for enhanced gain antenna design.

A new antenna design program could be developed to provide an inductive antenna with a specified inductive value needed to achieve a target Q value. To take advantage, however, of the years of experimental experience that produced the above equations, it may be more desirable to modify the above program as follows:

1. Have the program search for higher inductive values by inputting a successive series of shorter peak wavelength values for antenna parameter calculations.
2. Compute the impedance value of each wavelength.
3. Continue this computational sequence until the maximum allowable inductance is achieved.

This maximum inductance value will depend on the lowest value of capacitance that is technically feasible. As the inductance increases, the capacitance value must decrease for resonance balance. In current experimentation, capacitors for fractional picofarad values have been developed and used to balance circuits and antennas. There is currently, however, a lower physical limit on the size of these small capacitors. It is also possible to specify a lower inductance value based on a target Q value. Since the residual resistance should be held at 50 ohms for matching other electrical components or circuitry, for example, a Q target of 100 would limit the inductive reactance needed to 5,000 ohms. Recent capacitor development experience indicates that capacitors can be constructed to match inductances for Q values of 100.

To determine the Q of the circuit, the rf resistance and the inductive reactance may be determined using the following equation:

$$R = 0.996 \times 10^{-6} l' \sqrt{f}/12d$$

Where
R=rf resistance in ohms
f=frequency, in Hz d=conductor diameter, in inches
l'=wire length in inches $$L_h = 0.00254(F)(D)(N)^2$$

Where
   $L_h$=helix inductance in microhenries
   F=tabular function, Table 40 in *Inductance Calculations*, F. W. Grover, Dover, 1946, 2004
   r=D/NS
      Based on
         D—helix diameter in inches
         N—number of turns
         S—spacing between turns in inches
         r—tabular input $$X_L = 2\pi f L_h$$

Where
   $X_L$=reactance in ohms $$Q = X_L/R$$

The new resonance-enhanced antenna gain will then be $G'_p = (G_p)(Q)$.

The Loop Yagi Antenna Ferrite Application

Figure 6:
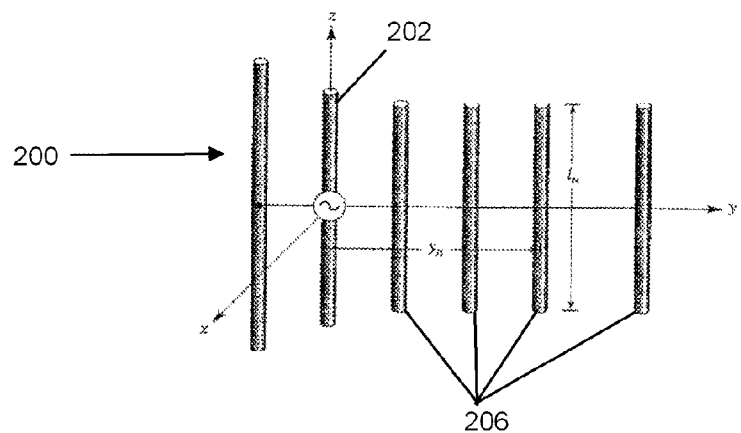
FIG. 6 is a side perspective view of a prior art Yagi-Uda antenna including a driven linear dipole element and a plurality of passive linear dipole elements.

A well known and very effective directional antenna is the Yagi-Uda antenna of early Japanese origin. In its original and most common version, it consists of a number of linear dipole elements comprising antenna 200 as shown in FIG. 6, one element 202 which is energized directly while the others elements 206 act as parasitic radiators whose currents are induced by mutual coupling spaced apart from energized element 202 in a y-axis or the direction of the antenna. FIG. 6 is from Balanis, C. A., *Antenna Theory, Analysis and Design*, Wiley, 2005.

Figure 7:
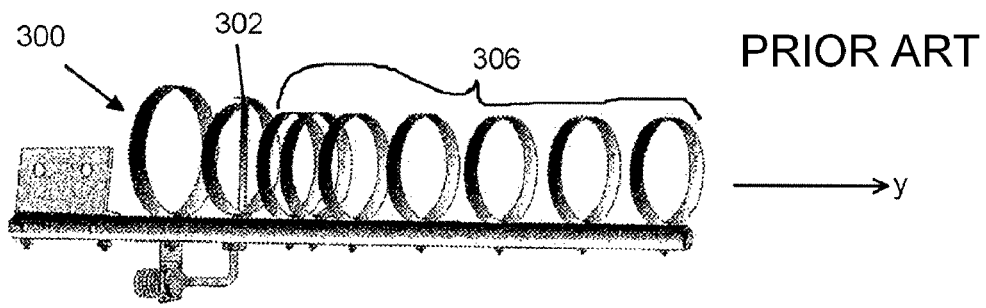
FIG. 7 is a side perspective view of a prior art Yagi-Uda loop antenna where the dipole elements have been reconfigured as loops.
Figure 8:
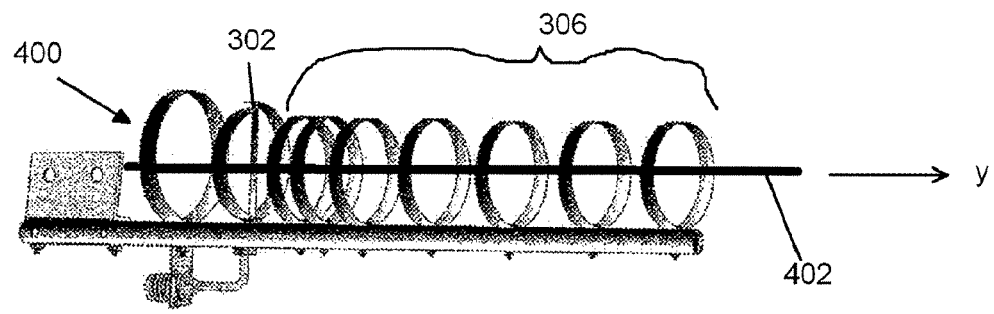
FIG. 8 is a side perspective view of a Yagi-Uda loop antenna according to the present invention with a magnetic core inserted within the loops.

A Yagi-Uda antenna 300 as shown in FIG. 7 may also be configured with an energized loop element 302 and a plurality of passive radiator loops 306. The direction of the antenna is indicated by a y-axis. Such a Yagi-Uda loop configuration as shown in FIG. 7 lends itself to ferrite-based magnetic gain amplification as an example of the technology of this invention. The specification for Loop Yagi Model 1209LY (Directive Systems of Lebanon, Maine) indicates a gain of 11.5 dBi. The addition of a ferrite core of suitable dimensions and appropriate axial mounting will increase the gain of the antenna proportional to the permeability of the ferrite rod and the Q of the LCR circuit. FIG. 8 illustrates a Yagi-Uda loop antenna 400 with an energized coil 302 and a plurality of passive radiator loops 306, and a ferrite rod 402 mounted axially within the loops. Ferrite rod 402 extends along a y-axis of antenna 400. The size and length of rod 402 are not intended to be representative of any suggested relative size of the rod with respect to the loops, but is merely shown as illustrative of the inclusion of a ferrite core within the loops.
   For $$\mu_{rod} = 40 = 16 \; dBi$$

$$Q = 10 = 10 \; dBi$$

Loop Yagi gain=11.5 dBi=14.12

The enhanced gain $$G' = (40)(10)(14.12) = 5640 = 37.5 \; dBi$$

The same total results from summing the three gains in dBi units.

A gain enhancement of 26 dBi represents a major contribution to the range and/or throughput capability of a wireless network. It is the equivalent of adding a 26 dB low noise preamplifier but without the need for external power. Such a high gain directional antenna could be directly connected to a VHF/UHF or SHF receiver to allow for longer range network with fewer access points and much lower infrastructure deployment costs.

The Helical Directional Antenna Ferrite Application

A second loop-based antenna configuration, the helical antenna, also lends itself to ferrite core-based gain enhancement. A very attractive feature of helical antenna technology is its versatility to serve as either a directional or an omnidirectional antenna. The directional helical mode will be described first.

Figure 9:
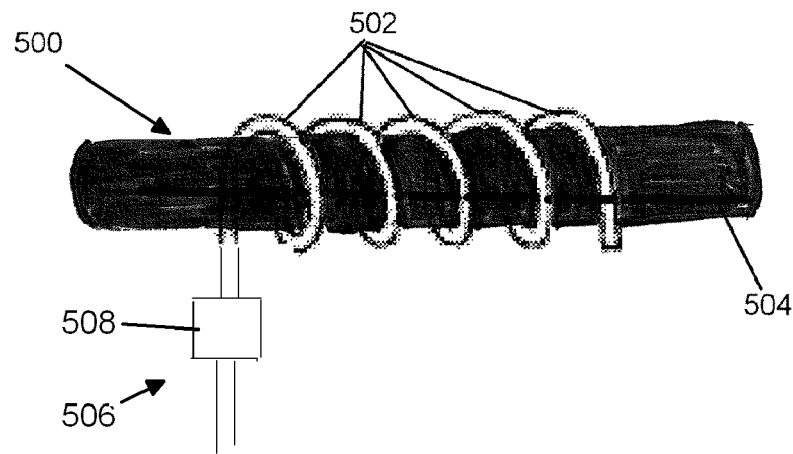
FIG. 9 is a side perspective view of a helical coil antenna according to the present invention with a ferrite core inserted within the antenna.

In the axial or "end-fire" mode, the circumference of the helix is of the order of one wavelength, and the spacing between turns is about a quarter wavelength. For the unlicensed 2.4 GHz band, the wavelength is about 13 cm (5.1 inches) indicating a helix with a diameter of 1.62 inches with turn spacing of 1.27 inches. A ten-turn helix would then measure about 13 inches in length close to the 12 inches boom length of the Loop Yagi antenna application. Based on established optimal design computer programs, as detailed in Balanis, C. A., *Antenna Theory, Analysis and Design*, Wiley Interscience, 2005, such an air core helical antenna has a potential gain of 14.21 dBi. Following the same reasoning as in the Loop Yagi antenna example described above with respect to FIG. 7, a ferrite core helical antenna would provide an additional gain of 26 dBi for a total gain of 40 dBi, or slightly more than the Loop Yagi example. A helical directional antenna 500 is shown in FIG. 9, with a plurality of loops 502 and a ferrite core 504 positioned axially within the loops. Circuitry 506 may be electrically attached to antenna 500 to connect antenna 500 to a wireless telecommunications device. Circuitry 506 may include an electrical component 508 that may permit the impedance of antenna 500 to be matched to the impedance of the wireless telecommunications device to which the antenna may be connected. Electrical component 508 may include but not be limited to a microstrip element.

Once more, the same modified antenna design approach involving inductance maximization previously described used to achieve a higher gain potential of this invention as applied to a helical directional antenna. The same iterative off-frequency use of the above software program may generate the highest feasible L, the matching C and the resulting Q for design optimization with respect to helical directional antennas. Recent experiments by the inventors have also shown that such off-frequency design results in shorter length and reduced size of the antenna—a highly desirable feature in commercial application.

The Helical Omnidirectional Antenna Ferrite Application

Omnidirectional antennas are isotropic radiators that transmit and receive radio frequency signals in all directions in a horizontal plane. Such antennas are required for mobile (cell phones) and nomadic (laptop computers) applications. Their lack of directionality reduces the potential gain of the antenna in comparison with directional antennas. Most omnidirectional antennas are basic dipole or monopole configurations, and enhanced antenna designs are valuable only to the extent they exceed dipole/monopole performance. A disadvantage of the dipole/monopole from the viewpoint of this invention is that is does not lend itself to ferrite magnetic amplification.

The helical antenna in its normal or broadside mode, however, is omnidirectional and may be gain-enhanced with a ferrite core of suitable dimensions. To operate in the normal mode, a helical antenna must be dimensionally small with helix diameters and turn spacing less than $0.1\lambda$ and $0.05\lambda$ respectively. Being electrically small, such antennas are very inefficient with low radiation resistance. The ratio of radiation resistance to circuit (loss) resistance is a measure of antenna efficiency. Although the normal mode helix antenna (NMHA) radiation resistance is still superior to a monopole of the same height, it is still low compared to the loss resistance. The layout of such an omnidirectional helical coil antenna is essentially the same as directional helical coil antenna 500 illustrated in FIG. 9. The y-axis of antenna 500 might be oriented differently within a particular communications device depending on the directional or omnidirectional usage desired, but the antenna itself will remain essentially the same, with different dimensions determined based on the particular wavelengths of the frequency used for communication.

$$\text{Resonant, stub helix } R=640(h/\lambda)^2 \text{ ohms}$$

$$\text{Monopole } R=395(h/\lambda)^2 \text{ ohms}$$

where
- R—radiation resistance
- h—height (length), inches
- $\lambda$—wavelength, inches A ferrite core stub helix will have its radiation resistance increased by the square of the rod permeability.

$$R_f=(\mu_{rod})^2 R_r$$

Where
- $\mu_{rod}$—relative core permeability compared to air core loop
- $R_f$—radiation, resistance of ferrite loop, ohms
- $R_r$—radiation, resistance of air core loop, ohm For a typical calcium vanadium garnet ferrite material where $\mu_{rod}$=40, the antenna efficiency would increase by a factor of 1600 or 32 dB. Such an enhancement would convert an antenna of 0 dBi or less gain into a highly sensitive receiving antenna that could significantly improve existing hand-held cellular radios. An example of a cellular radio antenna design described in Stutzman, W. L. and Thiele, G. A., *Antenna Theory and Design*, Wiley, 1998, in the 883 MHz ($\lambda$=34 cm) cellular telephone band is instructive:

Type—4 turn helix
- h—height=2.25 inches=0.168$\lambda$
- D—diameter=0.2 inches
- C—circumference=0.6 inches
- S—turn spacing=0.39 inches Such a stub helix antenna could use a calcium varradium garnet ferrite core 2.25 inches in length and 0.2 inches in diameter for a core length ratio of 11.25 which would provide a $\mu_{rod}$ of about 80 increasing the gain improvement to 6400 or 38 dB considerably better than the previous directional examples. Although there are still impedance matching issues in the cell phone application, the gain enhancement potential of a ferrite core helical antenna in cellular networks would allow for reduced transmitter power at cellular base stations—reducing radio interference and emerging rf human exposure problems that could severely handicap the growth of wireless communications networks.

In this example, a modified antenna design program, according to the present disclosure, might calculate values for an antenna design off-frequency to generate a high inductance which in turn might maximize the effect of ferrite permeability amplification. Increasing the inductance may maximize the effect of ferrite gain enhancement using the iterative computing approach previously described herein.

A superior omnidirectional helix antenna design would take advantage of the increased permeability resulting from having a ferrite core longer than the coil winding based on the formula $$\mu'=\mu_{rod}(a/b)^{1/3}$$

Where
- $\mu'$=enhanced permeability
- a=length of the core
- b=length of the coil In the above example, if the core were eight (8) times the winding in length (18 inches), the permeability would be doubled increasing the antenna gain by an additional 3 dBi. While a length of 18 inches is probably impractical for a cellular phone, it might still be suitable for a laptop computer. For WiFi mobile phones operating at 2437 MHz, the dimension would be reduced in inverse proportion to frequency to a suitable 6.5 inches.

Figure 10:
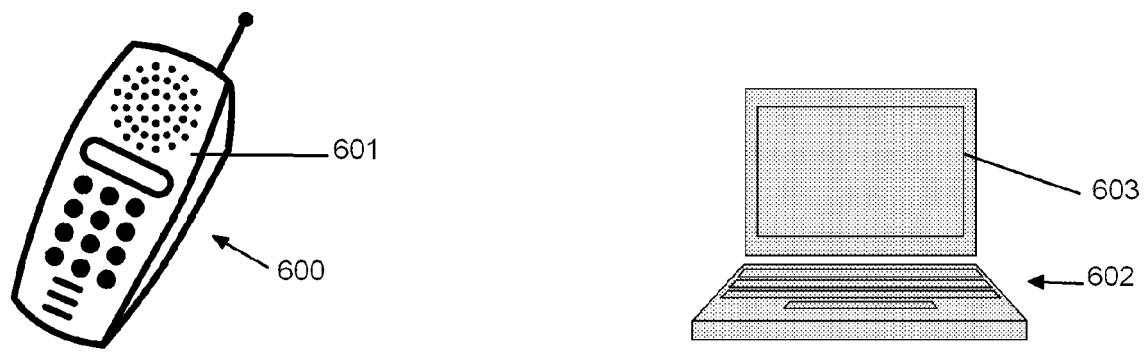
FIG. 10 is a perspective view of a pair of wireless telecommunications devices according to the present invention.

FIG. 10 illustrates a pair of wireless telecommunications devices incorporating helical coil antennas with ferrite cores such as are described above. Device 600 is a WiFi mobile phone with a housing 601 and device 602 is a laptop computer with a housing or case 603. The use of the antennas described herein is not intended to be limited to mobile phones and portable computers but may be incorporated into any number of other wireless telecommunications devices. Mobile phone 600 and laptop 602 are provided merely as illustrative examples and are not intended to be limiting in terms of the range of devices into which antennas of the present disclosure may be incorporated.

It is also important to point out that all of the above ferrite core-based loop antenna designs will likely result in through-put and range performances even greater than those indicated. Throughput and range performance are proportional to noise minimization as well as signal amplification based on the previous referenced Shannon's Law, and loop antennas are inherently lower in noise than their dipole counterparts.

Resonant Magnetic Preamplifier

The resonant magnetic preamplifier is a version of the magnetic preamplifier 700 shown in FIG. 11 in which a resonant amplifier circuit 706 provides signal amplification. An input matching circuit 702 and an output matching circuit 704 are required in all versions of the magnetic preamplifier. These matching circuits 702 and 704 provide efficient energy transfer to amplifier circuit 706 from an antenna coaxial cable 708 and to a receiver coaxial cable 710. In one embodiment, both matching circuits 702 and 704 are required to match a 50 ohm impedance. In other applications and for different implementations, a different level of impedance may need to be matched by the circuits. The key element is that the circuits must match the same impedance for maximal operational efficiency of the antenna and/or the device incorporating the antenna. A resonant amplifier circuit 712 using lumped element components is shown in schematic form in FIG. 12. A resonant amplifier is an inductance-capacitance-resistance (LCR) tank circuit in which the amplification is directly proportional to the Q of the circuit. A trimming resistor 714 allows for adjustment of the Q amplification and bandwidth of the amplifier.

Figure 13A:
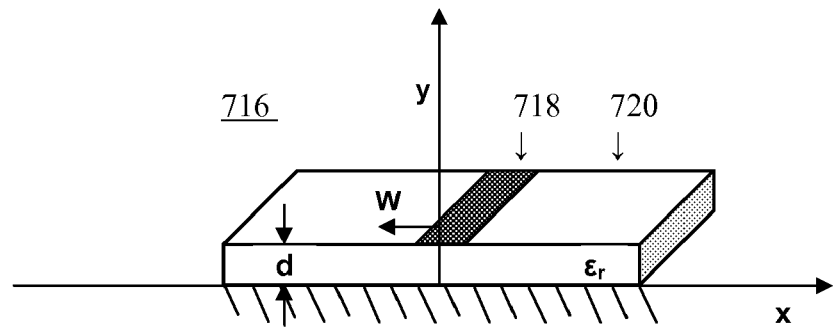
FIG. 13a is a layout drawing of a microstrip resonant magnetic preamplifier according to the present invention.
Figure 13B:
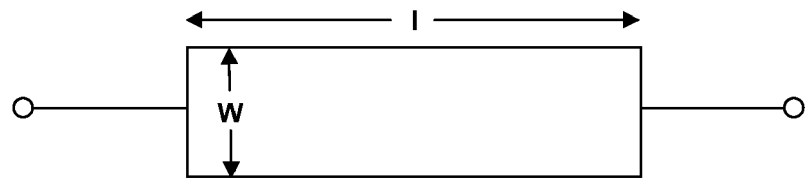

At higher radio frequencies above 1 Gigahertz, lumped element devices such as circuit 712 do not function as well as distributed element devices such as a microstrip resonator implementation 716 shown in FIGS. 13a and 13b. This device 716 consists of a thin copper metal conductor 718 mounted on a dielectric substrate 720 such as Teflon. The width (w), length (l) and thickness (d) determine the resonance characteristics of the device and are designed for the center frequency and the desired circuit gain. The microstrip implementation 716 of the resonant magnetic preamplifier is the preferred one from the viewpoints of the cost, compact size and stable performance.

Figure 14:
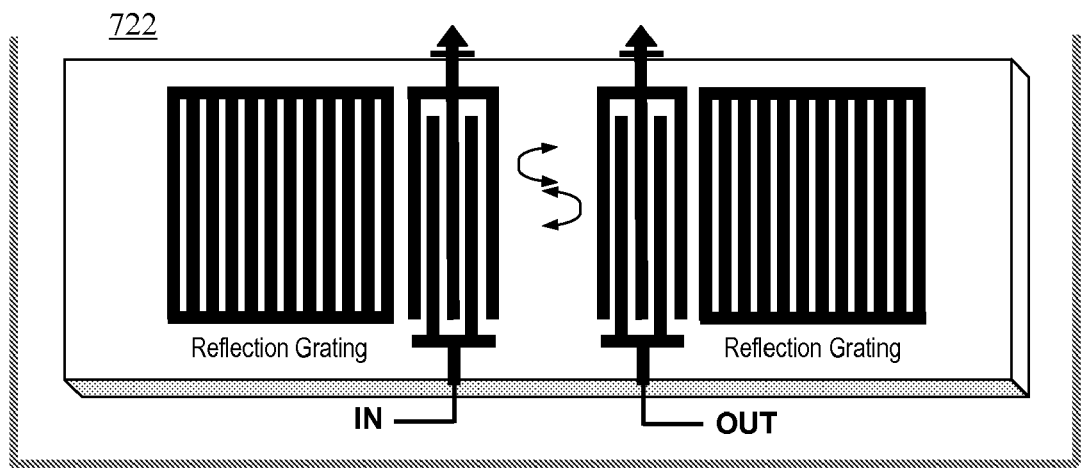
FIG. 14 is a layout drawing of a SAW resonant preamplifier according to the present invention.

A third version of the resonant magnetic amplifier is implemented using surface acoustic wave (SAW) technology. SAW devices convert incoming electric signals into acoustic waves which travel along the surface of a piezoelectric material such as quartz or lithium niobate. While traveling along the surface of the SAW device, the characteristics of the signal may be modified by a pattern of metal electrodes deposited on the surface for signal processing functions. SAW devices are used extensively in wireless communications for filters, oscillators and other functions. Multiple SAW devices are typically embedded in almost all cell phones used in cellular wireless networks. One SAW device configuration, a resonator, may be configured as a magnetic preamplifier to serve the same signal processing functions as described above using discrete components. A typical two-port SAW resonator 722 is shown in FIG. 14. The advantages of a SAW preamplifier include:

1. Stability

SAW devices are extremely stable maintaining their parameters even in a wide range of environments.

2. Cost

In mass production, SAW devices can be manufactured at a very low cost.

3. Compact Size

SAW devices are small enough for easy integration into cell phones, PDAs and other portable communications devices.

Ferrite Core Magnetic Preamplifier

Figure 15A:
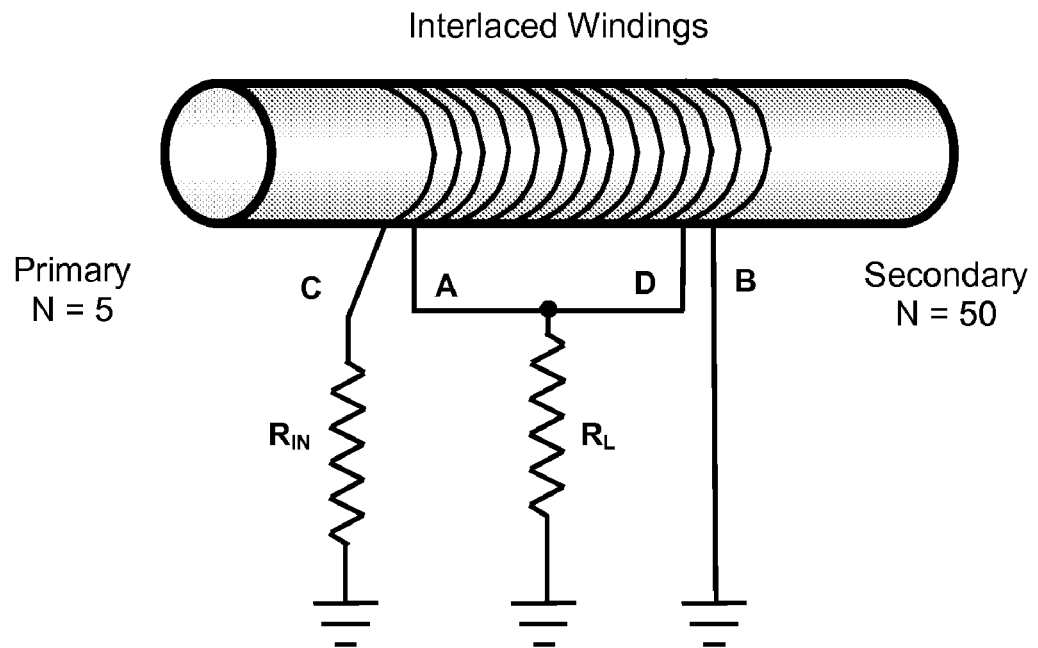
FIG. 15a is a schematic drawing of a topology for a transformer version of a ferrite core magnetic preamplifier according to the present invention.
Figure 15B:
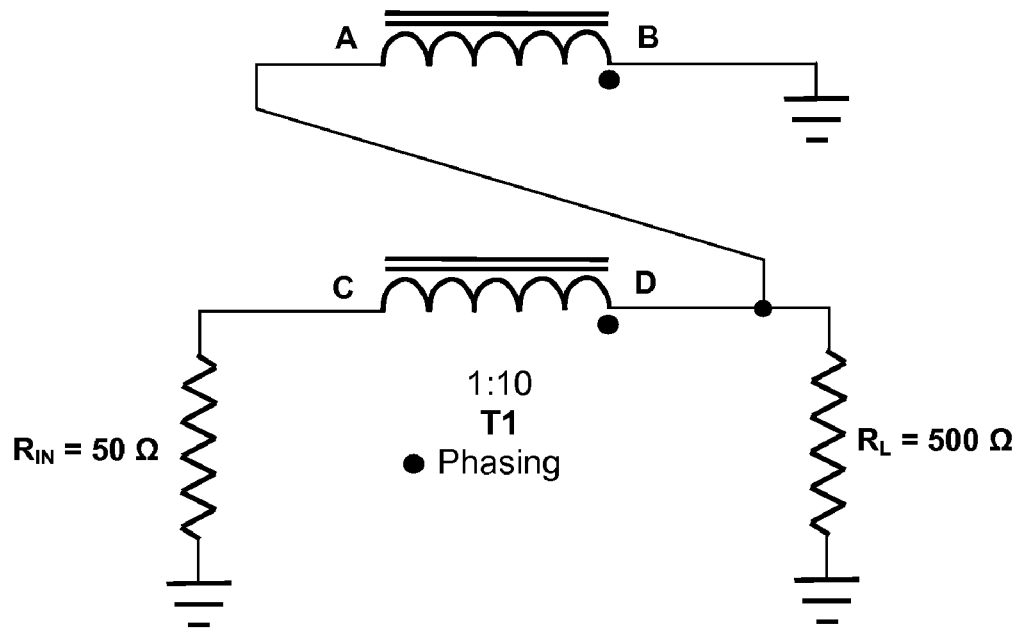

In the ferrite version of the helix antenna, the ferrite core provides an amplified output voltage at the antenna terminals much larger than an equivalent air core configuration of the same antenna. In a ferrite core magnetic preamplifier, the objective is to further amplify the signal voltage in the same manner as a Class A electronic amplifier. The signal voltage of an AC signal may be readily increased using a ferrite core transformer as shown in FIGS. 15a and 15b. In the example, a voltage gain of 10 is achieved with primary turns of 5 and secondary turns of 50. The primary and secondary turns are interlaced to improve the coupling of the signal to the ferrite core at these high frequencies. The higher permeability of the ferrite core plays a different role in this implementation. By increasing the permeability of the magnetic circuit, the reluctance is reduced decreasing the core losses in the transformer.

A magnetic preamplifier using a ferrite core may also be based on the general concepts previously illustrated in FIGS. 1, 2 and 3, except that the ferrite core is used not to collect airborne electromagnetic waves in antenna fashion. Rather, the ferrite serves to increase the magnetic flux density, electric field and subsequently the outgoing wireless signal amplitude for enhanced receiver sensitivity, signal-to-noise ratio enhancement and channel throughput performance.

In a solenoid coil implementation, the flux density is expressed in the following equation:

$$B = \mu N I_i / l \text{--solenoid equation}$$

Where

B=flux density—Tesla
  $\mu$=permeability of medium—henries/meter
  N=number of turns in solenoid—dimensionless
  $I_i$=incoming current—amperes
  l=length of solenoid—meters The ferrite permeability value ($\mu$) is the key factor in the technology and is expressed as:

$$\mu = \mu_r \mu_o$$

Where:

$\mu_r$=permeability of ferrite core rod relative to air
  $\mu_o$—permeability of air=$4\pi \times 10^{-7}$ henries/meter For a calcium vanadium ferrite rod, the manufacturer, TCI Ceramics, measured an initial permeability of 313. For a ferrite rod 3 inches in length and 0.3 inches in diameter for length/diameter ratio of 10, a rod permeability of 40 is estimated from a graph similar to that shown in FIG. 3. Based on an induced increased electrical field resulting from the enhanced magnetic field, the electric field, current density and outgoing current signal will be enhanced:

$$E = \pi f B R \text{--Faraday's Law}$$

Where:

E=electric field–volts/meter
  f=frequency of AC field–Hertz
  B=flux density–Tesla
  R=radius of electric field–meters $$J = E\sigma$$

Where

J=output current density–ma/cm$^2$
  $\sigma$=conductivity–$\mu$S/cm $$I_o = Ja$$

Where $I_o$=output current–amperes
  a=cross sectional area of conductor–cm$^2$

Figure 16:
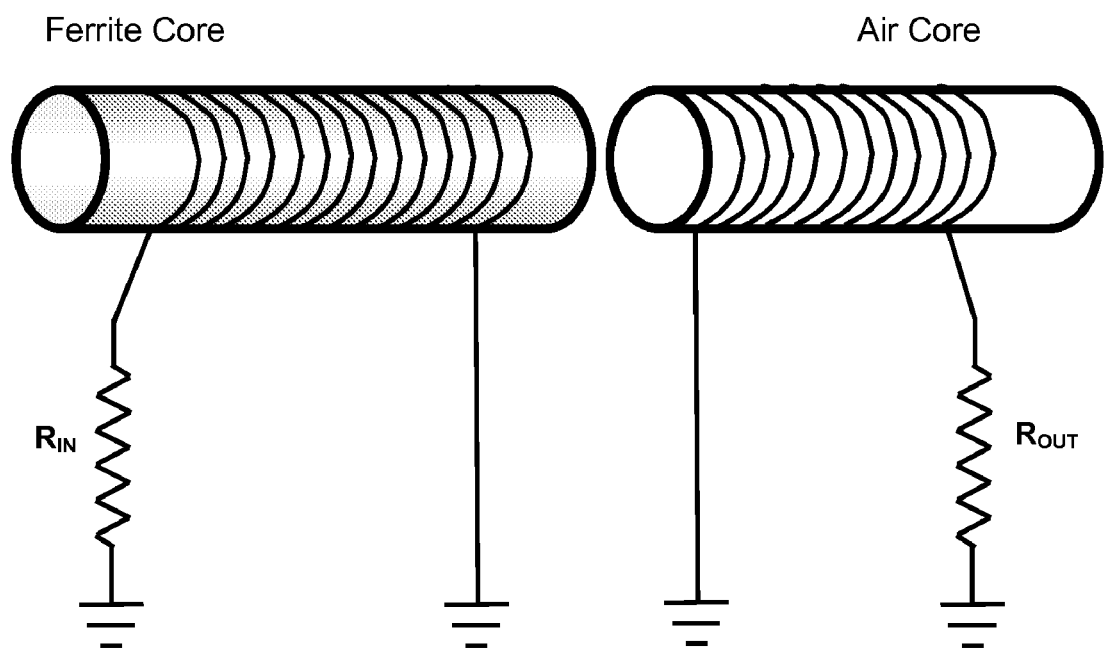
FIG. 16 is a schematic drawing of a topology for an inductor version of a ferrite core magnetic preamplifier according to the present invention.

Implementation of this inductor version of the ferrite core magnetic preamplifier may be accomplished using the helix (or solenoid) coils illustrated in FIGS. 4 and 5. The conversion process, however, is reversed with the incoming signal current being amplified by the increased flux density and subsequent field strength of the coil. This amplified field strength will produce an amplified current in a parallel coil through mutual inductance as shown in FIG. 16 The gain of the amplifier will be the ratio of the output current to the input current as shown in the above equation set. Based on a rod core permeability of 40, an amplifier gain of 32 dB would be realized. The inductor version has an advantage over the transformer version in that voltage, current and power are amplified. In the transformer, current is reduced in direct proportion to the voltage amplification.

While the invention has been described with reference to preferred embodiments, it is to be understood that the invention is not intended to be limited to the specific embodiments set forth above. Thus, it is recognized that those skilled in the art will appreciate that certain substitutions, alterations, modifications, and omissions may be made without departing from the spirit or intent of the invention. Accordingly, the foregoing description is meant to be exemplary only, the invention is to be taken as including all reasonable equivalents to the subject matter of the invention, and should not limit the scope of the invention set forth in the following claims.

What is claimed is:

1. A wireless telecommunications device comprising:
   a housing;
   an antenna;
   a passive magnetic preamplifier electrically connected to the antenna;
   wherein the device communicates in frequencies greater than 0.3 gigahertz; and,
   wherein the preamplifier is one of a lumped element component amplifier and a ferrite core magnetic preamplifier.

2. The wireless telecommunications device of claim 1, wherein the preamplifier includes an input matching circuit and an output matching circuit, and the impedance of the input and output circuits are matched to each other.

3. The wireless telecommunications device of claim 2, wherein the impedance of the input and output circuits of the preamplifier are matched to an impedance of fifty ohms.

4. A wireless telecommunications device comprising:
- a housing;
- an antenna;
- a passive magnetic preamplifier electrically connected to the antenna;
- wherein the device communicates in frequencies greater than 0.3 gigahertz.

5. The wireless telecommunications device of claim 4, wherein the preamplifier is one of a lumped element component amplifier and a ferrite core magnetic preamplifier.

6. The wireless telecommunications device of claim 4, wherein the preamplifier includes an input matching circuit and an output matching circuit, and the impedance of the input and output circuits are matched to each other.

7. The wireless telecommunications device of claim 6, wherein the impedance of the input and output circuits of the preamplifier are matched to an impedance of fifty ohms.

* * * * *